US010965003B2

(12) United States Patent
Donkle et al.

(10) Patent No.: US 10,965,003 B2
(45) Date of Patent: Mar. 30, 2021

(54) NAMEPLATE CARRIER AND ANTENNA HOLDER

(71) Applicant: ACLARA TECHNOLOGIES LLC, St. Louis, MO (US)

(72) Inventors: Steven Donkle, St. Charles, MO (US); Lewis E. Fink, III, Sanford, ME (US); Michael Smith, Ballwin, MO (US); Wayne Therrien, Rochester, NH (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 16/358,037

(22) Filed: Mar. 19, 2019

(65) Prior Publication Data

US 2019/0288369 A1 Sep. 19, 2019

Related U.S. Application Data

(60) Provisional application No. 62/645,035, filed on Mar. 19, 2018.

(51) Int. Cl.

| | |
|---|---|
| ***H01Q 1/04*** | (2006.01) |
| ***H01Q 1/22*** | (2006.01) |
| ***H01Q 9/28*** | (2006.01) |
| ***G01D 4/00*** | (2006.01) |

(52) U.S. Cl.
CPC .......... *H01Q 1/2233* (2013.01); *G01D 4/008* (2013.01); *H01Q 9/285* (2013.01)

(58) Field of Classification Search
CPC ........ H01Q 1/2233; H01Q 1/04; H01Q 9/285; H01Q 1/22; H01Q 9/28
See application file for complete search history.

(56) References Cited

U.S. PATENT DOCUMENTS

| | | | | |
|---|---|---|---|---|
| 7,692,600 B1 * | 4/2010 | Pakosz | H01Q 1/2233 | 343/795 |
| 8,188,884 B2 * | 5/2012 | Randall | H01Q 1/2233 | 340/870.02 |
| 9,093,744 B2 * | 7/2015 | Seal | H01Q 9/16 | |
| 9,525,202 B2 * | 12/2016 | Podduturi | H01Q 1/2233 | |
| 2012/0227518 A1 * | 9/2012 | Abdul-Hadi | G01D 4/008 | 73/866.1 |
| 2014/0118202 A1 * | 5/2014 | Lin | H01Q 1/2233 | 343/720 |
| 2015/0255940 A1 * | 9/2015 | Seals | H02S 40/34 | 439/620.26 |

* cited by examiner

*Primary Examiner* — Hoang V Nguyen
(74) *Attorney, Agent, or Firm* — Michael Best & Friedrich, LLP

(57) ABSTRACT

Disclosed herein are devices, designs, and methods of attaching an antenna to a utility meter faceplate. The faceplate is capable having an antenna adhesively attached to a side surface of the faceplate in a manner that minimizes noise from meter components.

17 Claims, 5 Drawing Sheets

NAMEPLATE CARRIER AND ANTENNA HOLDER

FIELD OF THE PRESENT DISCLOSURE

The present disclosure generally relates to a faceplate or nameplate carrier commonly found in utility meters. In particular, the present disclosure relates to an improved antenna mount on faceplate or nameplate carriers.

BACKGROUND

Utility meters are often used to measure and monitor utility usage and the meters often require the display of identifying information for visual inspection. This identifying information often includes information such as the utility name, customer information, meter serial number, meter class, service type, and information regarding the meter manufacturer.

Traditionally, utility meters were physically inspected and monitored on-site at the location of the meter. Today, however, many utility meters are read remotely using data transmitted from the meter to a separate reader device or the data may be transmitted to the utility company directly using various wired or wireless communications. As such a transceiver device that includes an antenna is often incorporated into the utility meter. As more utility meters are configured for remote reading, the meters must be redesigned or reconfigured to include antennas and the identifying information. These reconfigurations add additional cost in manufacturing and time in assembly.

Therefore, an antenna mounting apparatus that does not add additional components to the manufacturing process is needed. Similarly, an antenna mounting apparatus that is simple to assemble quickly is also desired.

SUMMARY

The present application relates to a combination faceplate antenna holder for electric utility meter. It is an object of this invention to reduce the number of components required to manufacture utility meters and utility meter faceplates. It is a further object of this invention to reduce the difficulty of the manufacturing process.

The combination faceplate antenna holder for an electric utility meter may include a round plastic faceplate member that has a side surface, a top surface, and a bottom surface. The side surface of the faceplate member generally has an annular configuration so that the faceplate member can be engaged to a curved dipole antenna attached to the side surface of the holder. The dipole antenna may be attached to the side surface using an adhesive, mounting tape, screws, bolts, or other fasteners.

The dipole antenna has an internal surface and an external surface. The internal surface of the dipole antenna has an arc of curvature. The curvature of the dipole antenna allows the internal surface of the dipole antenna to be adhesively attached to the side surface of the faceplate member so the majority of the surface of the antenna is in contact with the side surface of the holder.

The faceplate antenna holder may be used in a utility meter for monitoring utility usage. The utility meter may further include a housing, a metering component base for housing one or more metering components, and a meter base.

The dipole antenna may be attached to the faceplate antenna holder by applying an adhesive to the inner surface of the antenna and then adhering the antenna to a side surface of a faceplate antenna holder. The metering components may be attached to a metering component base configured to hold metering components. The faceplate antenna holder may then be attached to the meter base.

Other advantages of the invention will become apparent from this disclosure including the accompanying drawings, wherein is set forth by way of illustration and example an embodiment of the present invention.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

As required, a detailed embodiment of the present invention is disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The invention is to a faceplate antenna holder 10 as shown in FIGS. 1-5 and a method of using an adhesive to attach an antenna 20 to the faceplate antenna holder 10. Specifically, the invention is to a faceplate antenna holder that is an improvement over traditional meter faceplates that are not configured for accepting a meter antenna. The faceplate is designed so an antenna can be attached to a surface of the faceplate, wherein the faceplate is configured to keep the antenna a suitable distance from metering components for minimizing interference of signals relayed by the antenna. Additionally, the antenna's configuration allows the antenna to be attached to a side surface of the faceplate antenna holder 10.

Figure 1:
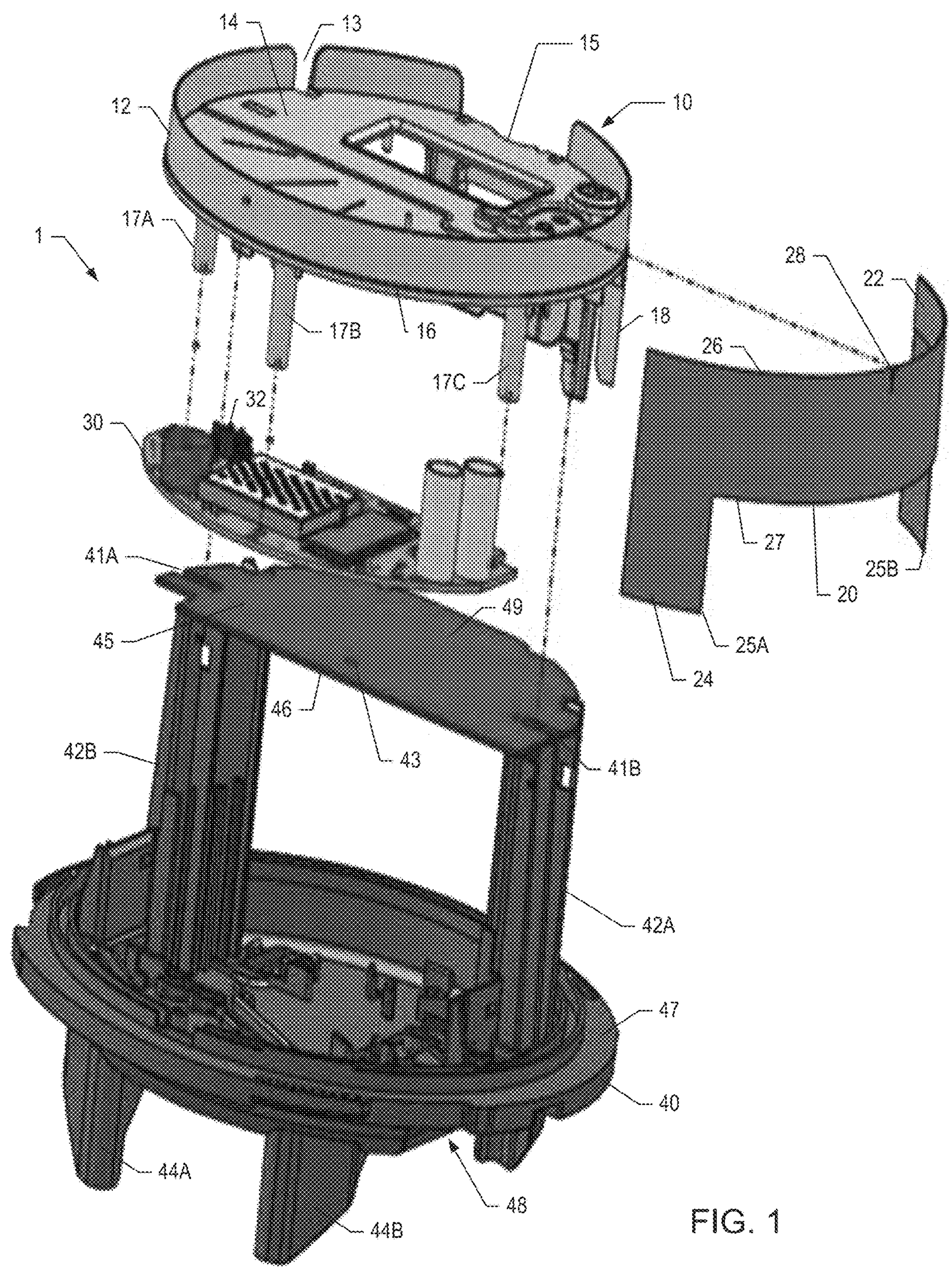
FIG. 1 illustrates an exploded view of the combination faceplate antenna holder in one embodiment.
Figure 2:
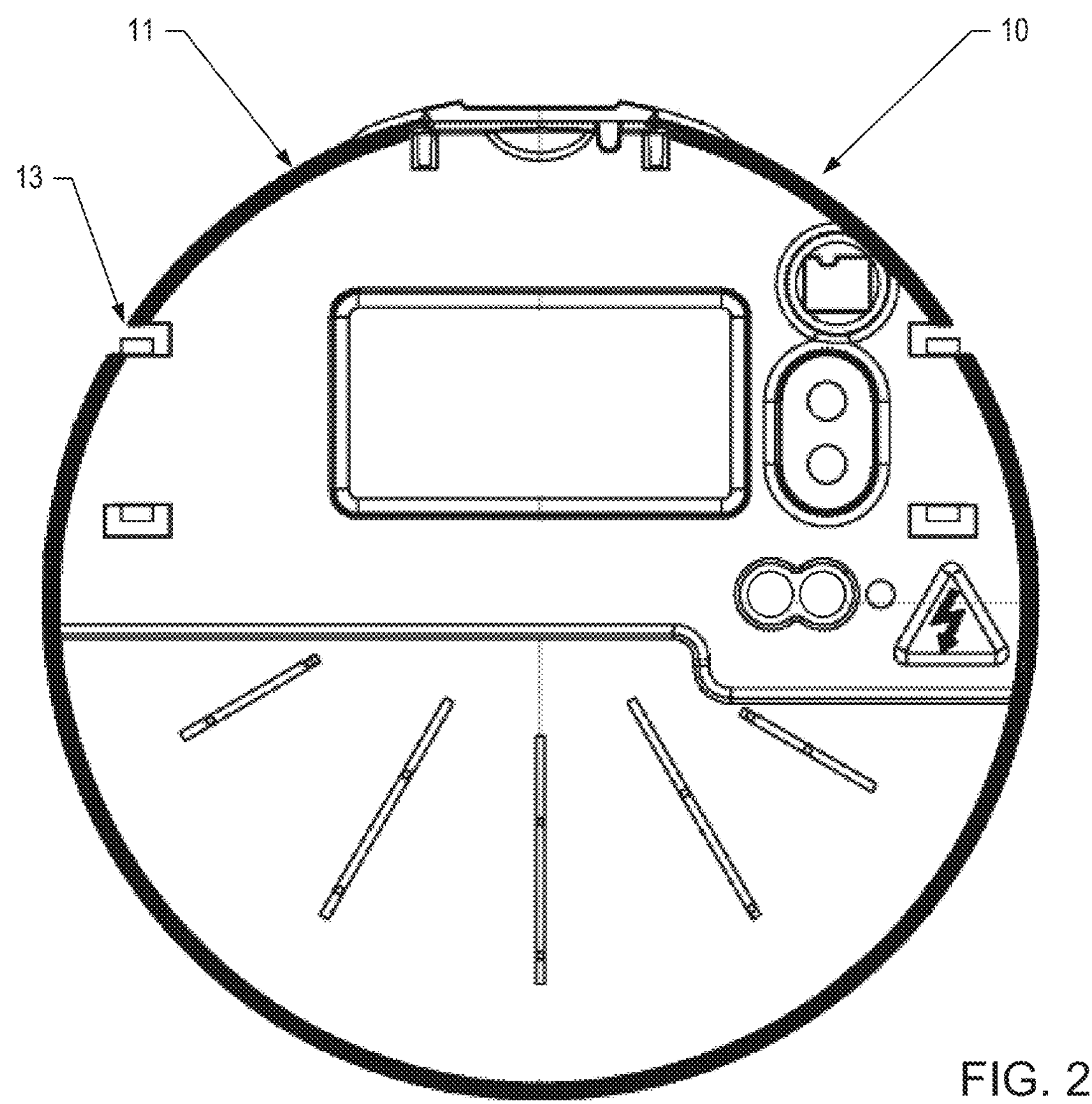
FIG. 2 illustrates a front view of the combination faceplate antenna holder in one embodiment.
Figure 3:
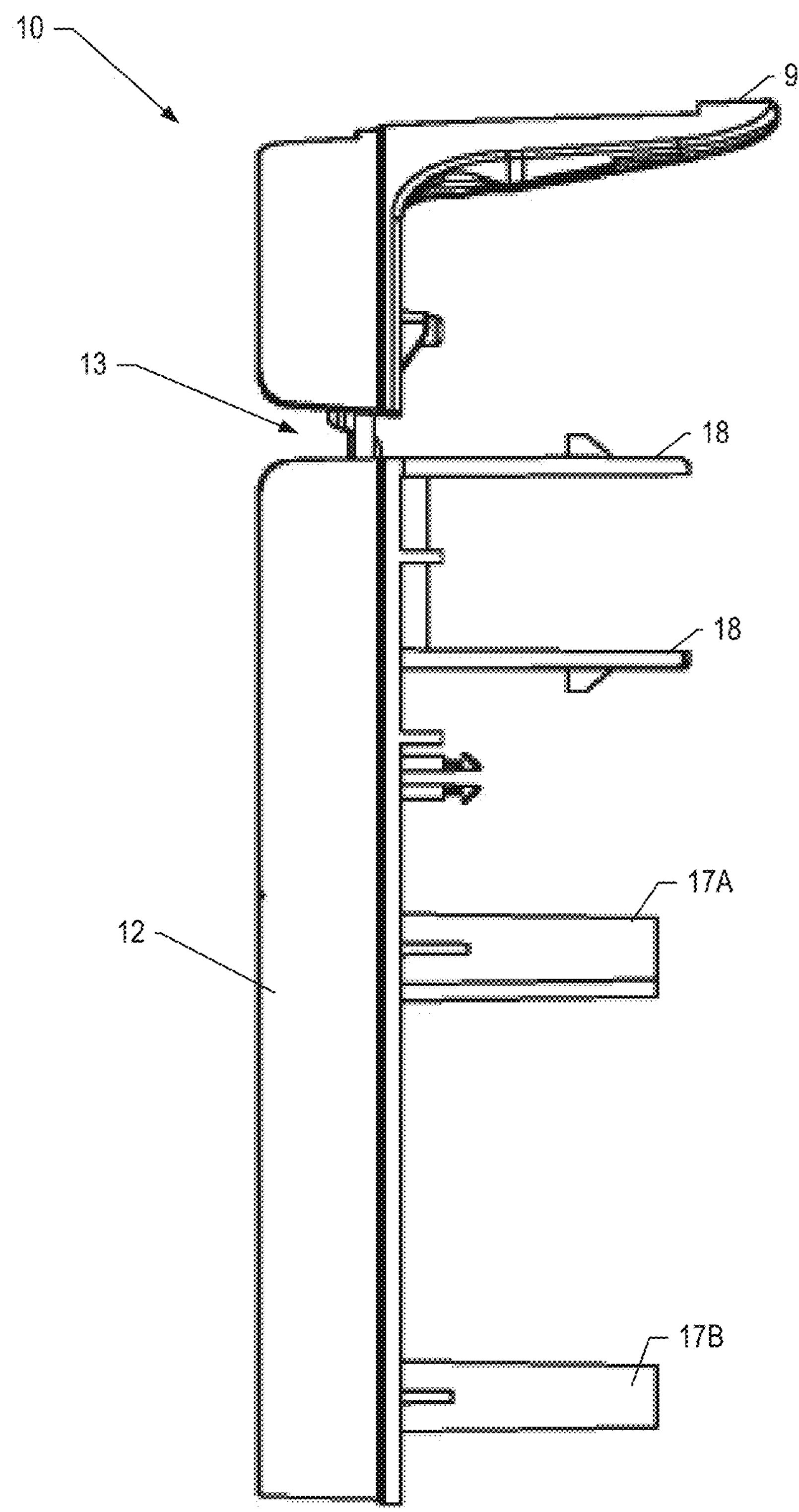
FIG. 3 illustrates a side view of the combination faceplate antenna holder in one embodiment.

The faceplate antenna holder 10 has a side surface 12 that supports a dipole antenna 20. For example as shown in FIG. 1, the faceplate antenna holder 10 may have a side surface 12 configured to have the inner surface 22 of the dipole antenna 20 attached thereto. The faceplate antenna holder 10 may be attached to a meter base 40.

The faceplate antenna holder may be configured to accept any suitable antenna known in the art. One of skill in the art will appreciate that the antenna may be of a type that allows for wireless communications using any wireless communication network. One of skill in the art will further appreciate that the communications networks may include internet, WiMAX, Wi-Fi, or any other type of communication network known in the art. In various embodiments, the antenna 20 is preferably mounted in a way that minimizes noise and other interference. Further, the antenna has dimensions that allow it to convey the RF signals at suitable power levels.

The dipole antenna 20 may be a curved planar sheet of material having an inner surface 22 opposite an outer surface 24. The dipole antenna 20 may have a top edge 26 opposite a bottom edge 27. The bottom edge 27 of the antenna 20 may include one or more antenna tabs 25A-B. The top edge 26 of the antenna 20 may have a slit 28 cut into it. The configuration of the antenna 20, including the slit 28 and the tabs 25A-B, make the antenna 20 suitable for facilitating RF signal communication. The dipole antenna 20 may be curved so that the internal surface 22 of the dipole antenna 20 has a first radius, and the outer surface 24 of the antenna 20 has a second radius.

The dipole antenna 20 may be formed from a planar metal. In some embodiments the antenna 20 may be formed from brass. In other embodiments, the antenna may be formed from copper. One of skill in the art will appreciate that the antenna may be formed from any metal or non-metal conductive material known in the art.

Figure 4:
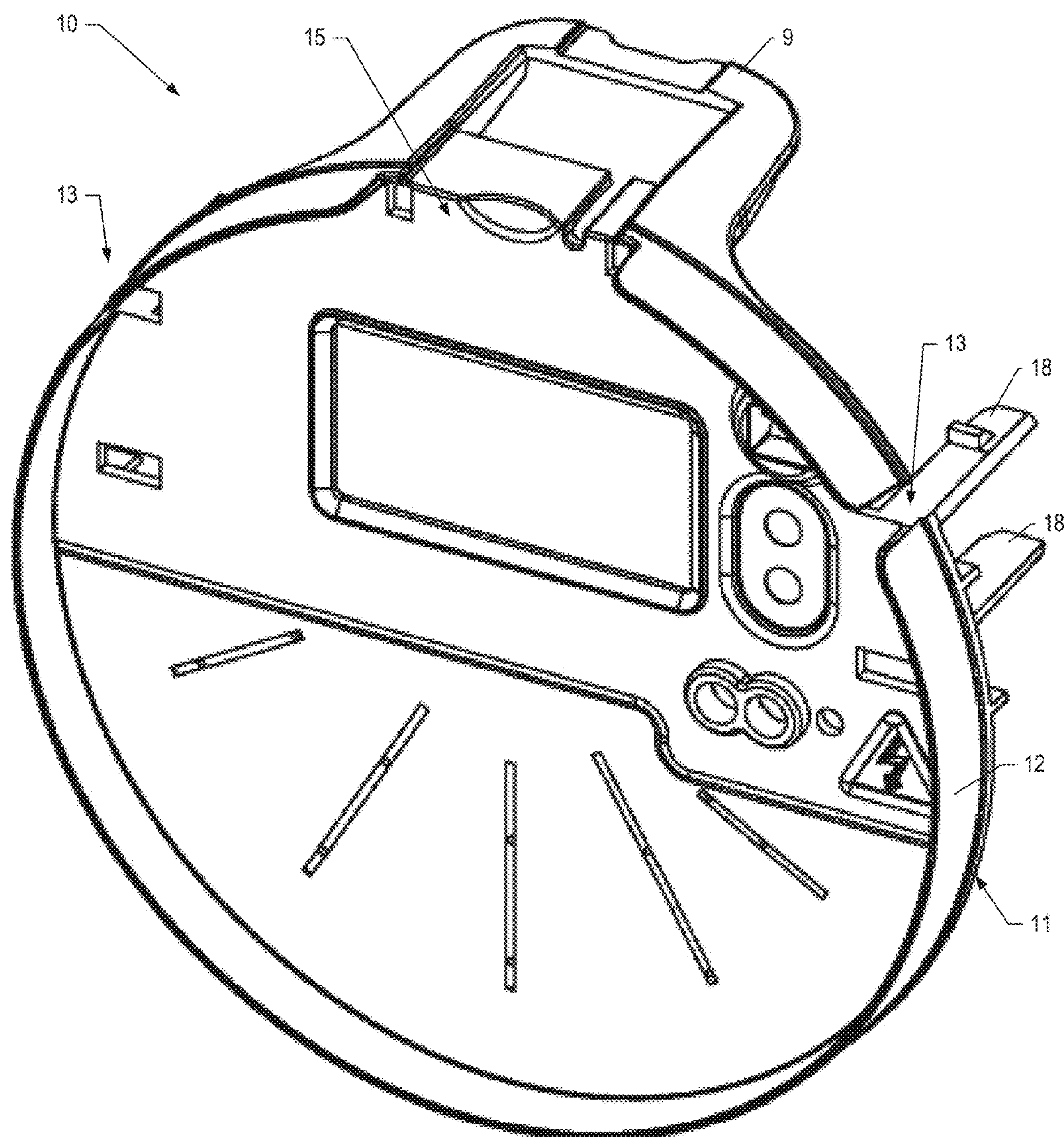
FIG. 4 illustrates a perspective view of the combination faceplate antenna holder in one embodiment.
Figure 5:
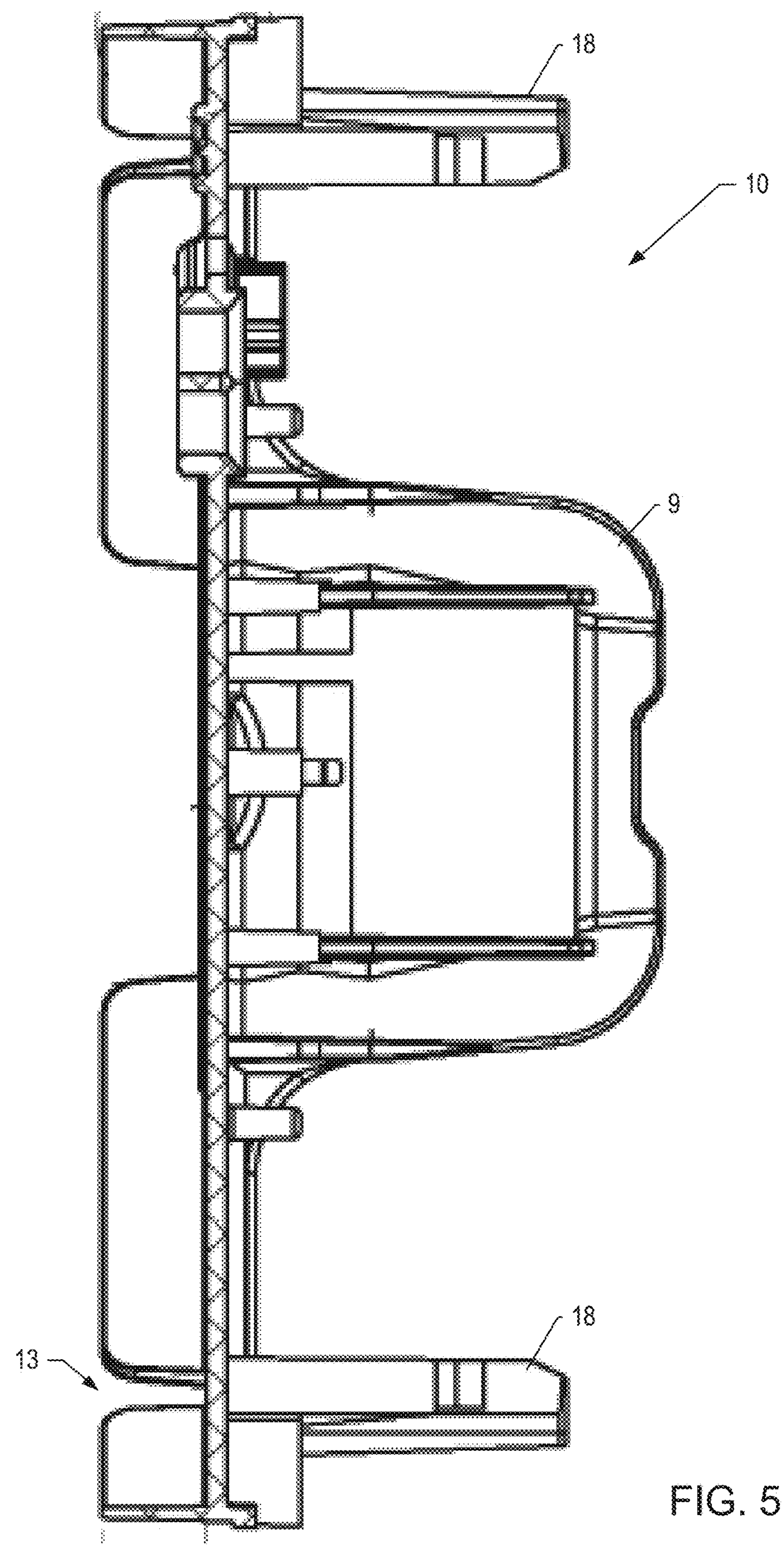
FIG. 5 illustrates a side view of the combination faceplate antenna holder in one embodiment.

The faceplate antenna holder 10 is configured to hold an antenna 20 and for displaying meter information such as regulatory information, model number, bar codes, brand information, serial numbers, and other meter information. The faceplate antenna holder 10 serves at least two purposes, holding an antenna, and providing a surface to display meter identifying information. The faceplate antenna holder 10 may display digital information, analog information, or combinations thereof. The faceplate antenna holder 10 may have a holder top surface 14 opposite a holder bottom surface 16. The faceplate antenna holder 10 may have a faceplate wall 11 that wraps around the faceplate antenna holder 10. The faceplate wall 11 may extend above the holder top surface 14. The faceplate wall 11 may have an inner surface and a holder side surface 12 that forms the outer surface of the faceplate wall 11. The holder side surface 12 may be continuous. In some embodiments, the holder side surface 12 may have a first notch 13 and a second notch 15. The first notch 13 and the second notch 15 may be the same size. In other embodiments, as shown in FIG. 1 and FIG. 4, the first notch 13 and the second notch 15 may have different sizes. A faceplate clip 9 may be located below the second notch 15. The faceplate clip 9 may be a U-shaped extension of the faceplate antenna holder 10, configured to secure the faceplate antenna holder 10 to the meter base. The bottom surface of the faceplate antenna holder 10 may include one or more screw acceptors 17A-C. These screw acceptors may be configured to guide and secure fasteners such as screws or rivets, into accepting locations of the meter base 40. The faceplate antenna holder 10 may also include one or more holder tabs 18 configured to guide the faceplate antenna holder 10 so it is readily accepted by the meter base 40. The faceplate antenna holder 10 may have a circular shape that allows the holder 10 to fit within the confines of a dome (not shown) that is used for covering the utility meter. One of skill in the art will appreciate that the faceplate antenna holder 10 may have any shape known in the art, so the faceplate antenna holder 10 fits within the dimensions of the complete meter assembly. The faceplate antenna holder 10 may provide a location for accepting an antenna 20 so interference from the metering components 32 or other sources of interference from the meter are minimized.

The faceplate antenna holder 10 may be used with a meter base 40 and may serve as a holder for various electric and mechanical structures that are used for monitoring utility usage. One of skill in the art will appreciate that the meter base 40 may be configured to hold gears, brackets, disks, rivets, and other electric and mechanical structures used for monitoring utility usage. The meter base 40 may have a top surface 47 opposite a bottom surface 48. The bottom surface 48 of the meter base 40 may include one or more base tabs 44A-44B. The base tabs 44A-44B may be configured for installation at location for utility usage monitoring. The bottom surface 48 of the meter base 40 may have any configuration known in the art for being accepted by a utility usage monitoring location. One of skill in the art will further appreciate that the meter base 40 may have any configuration typical of a utility meter. The top surface 48 meter base may have two meter base legs 42A-B that extend away from the top surface 48 base. The meter base legs 42A-B may be configured to have a separation plate 49 attached to the end of the legs 42A-B opposite the end of the legs 42A-B that is in contact with the top surface 47 meter base 40. The legs 42A-B of the meter base 40 have a length sufficient for separating the faceplate antenna holder 10 from the various electric and mechanical structures that are used for monitoring utility usage.

The separation plate 49 may have a separation plate top surface 45 opposite a separation plate bottom surface 46. The separation plate 49 may have a semi-circle shape. The separation plate 49 may have one or more plate openings 41A-B. The plate openings 41A-B may be configured for accepting the tabs 18 of the faceplate antenna holder 10 so the faceplate antenna holder 10 is securely attached to the separation plate via the plate openings 41A-B. The separation plate 49 may also include holes 43 for accepting screws, rivets, or other fasteners known in the art. While the separation plate 49 shown in FIG. 1 has a semi-circle shape, one of skill in the art will appreciate that the separation plate 49 may have any shape known in the art. The separation plate 49 may be formed from the same material as the meter base. By way of non-limiting example, the meter base 40 may be formed from a non-conductive material such as plastic. In this regard, the meter base 40 does not cause interference that may be attributed to conductive properties. Similarly, the separation plate 49 may be formed from a non-conductive material.

A complete utility meter apparatus 1 may include a meter component base 30 which houses various metering components 32. These metering components may be any components known in the art. The meter component base 30 may have a top surface and a bottom surface. The top surface of the meter component base 30 may be configured to hold various metering components 32. In some embodiments, the meter component base 30 may have a semi-circle shape that allows the meter component base 30 to fit on the top surface 47 of the meter base 40. One of skill in the art will appreciate that the meter component base 30 and the various metering components 32 may include features of any utility meter known in the art. One of skill in the art will also appreciate that the meter component base 30 may be formed from any material known in the art for making a meter component base.

Method of Attaching

The faceplate antenna holder 10 and a suitable dipole antenna 20 may be installed into a utility meter by first attaching the dipole antenna 20 to faceplate antenna holder 10. The internal surface 22 of the dipole antenna 20 may have an adhesive, including but not limited to double-sided tape or mounting tape, applied thereto. The internal surface 22 of the dipole antenna 20 may then be affixed to the holder side surface 12. One of skill in the art will appreciate that an adhesive may be attached to holder side surface 12 of the faceplate antenna holder 10 and then affix the dipole antenna 20 to the holder side surface 12 of the faceplate antenna holder 10. One of skill in the art will also appreciate that an adhesive may be attached to holder side surface 12 of the faceplate antenna holder 10 and the internal surface 22 of the dipole antenna 20 and then the dipole antenna 20 may be attached to the holder side surface 12 of the faceplate antenna holder 10. The adhesive for attaching the dipole antenna 20 to the side surface 12 may be any adhesive known in the art.

The metering component base 30 may be attached to the meter base 40 using any means known in the art. For example, the metering component base 30 may be attached to the top surface of the meter base 40 using screws, bolts, or other fasteners known in the art. The faceplate antenna holder 10 and the dipole antenna 20 may be attached to a top surface 45 of the separation plate 49 so that the antenna 20 is kept separated from the meter base 40 and the metering components 32. The faceplate antenna holder 10 may be attached to the separation plate 49 by inserting the holder tabs 18 into the plate openings 41A-B of the separation plate 49. The holder tabs 18 of faceplate antenna holder 10 may clip into the meter base legs 42A-B. The faceplate antenna holder 10 may then be secured to the separation plate 49 by inserting screws or bolts into the screw acceptors 17A-C.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A combination faceplate antenna holder for an electric utility meter, the combination faceplate antenna holder comprising:

a generally round faceplate member, wherein the faceplate member has a side surface, wherein the side surface of the faceplate member has a faceplate circumference, wherein the faceplate member is configured to have a dipole antenna attached to the side surface;

a retention clip extending from a peripheral edge of the faceplate member;

the dipole antenna having an internal surface and an external surface, the internal surface having an antenna arc curvature, wherein the antenna arc curvature is similar to a portion of the faceplate circumference, such that the dipole antenna may be attached to the side surface of the faceplate member.

2. The faceplate antenna holder of claim 1, wherein the dipole antenna comprises a planar metal sheet.

3. The faceplate antenna holder of claim 1, wherein the dipole antenna comprises copper.

4. The faceplate antenna holder of claim 1, wherein the faceplate member is configured to display meter identifying data.

5. A utility meter for monitoring utility usage, the utility meter comprising:

a faceplate member, wherein the faceplate member has a side surface, wherein the side surface of the faceplate member has a faceplate circumference;

a dipole antenna configured to engage the side surface of the faceplate member, the dipole antenna having an internal surface and an external surface, the internal surface having an antenna arc curvature, wherein the antenna arc curvature is similar to a portion of the faceplate circumference, such that the dipole antenna may be attached to the side surface of the faceplate member;

the faceplate member further defining a housing for a metering component base, the metering component base for housing one or more metering components; and a meter base, wherein the faceplate member further comprises a retention clip extending from a peripheral edge of the faceplate member, wherein the retention clip engages the meter base.

6. The utility meter of claim 5, wherein the metering component base is disposed between the faceplate member and the meter base.

7. The utility meter of claim 5, wherein the dipole antenna is isolated from components on engaged to the metering component base to minimize interference.

8. The faceplate antenna holder of claim 5, wherein the dipole antenna comprises a planar metal sheet.

9. The faceplate antenna holder of claim 5, wherein the dipole antenna comprises copper.

10. The faceplate antenna holder of claim 5, wherein the faceplate member is configured to display meter identifying data.

11. A method of attaching a dipole antenna to a utility meter, the method comprising:

attaching an inner surface of the dipole antenna to a side surface of a faceplate antenna holder;

attaching a metering component base to a meter base; and attaching the faceplate antenna holder to the meter base, wherein the faceplate member further comprises a retention clip extending from a peripheral edge of the faceplate antenna holder, wherein the retention clip engages the meter base.

12. The method of claim 11, further comprising, affixing one or more metering components to a metering component base.

13. The method of claim 12, wherein attaching the dipole antenna to the faceplate antenna holder isolates the dipole antenna from the one or more metering components to minimize interference.

14. The method of claim 11, wherein the metering component base is disposed between the faceplate member and the meter base.

15. The method of claim 11, wherein the dipole antenna comprises a planar metal sheet configured to match a curvature of the side surface of the faceplate antenna holder.

16. The method of claim 11, wherein the dipole antenna comprises copper.

17. The method of claim 11, further comprising affixing meter identifying data to the faceplate antenna holder.

* * * * *